United States Patent [19]

Coen

[11] Patent Number: 5,149,431

[45] Date of Patent: Sep. 22, 1992

[54] FILTER CANISTER WITH A PLASTIC PIPE AND A METAL BUSHING

[76] Inventor: David S. Coen, 8227 S. Gary, Tulsa, Okla. 74137

[21] Appl. No.: 617,131

[22] Filed: Nov. 23, 1990

[51] Int. Cl.⁵ .............................................. B01D 29/15
[52] U.S. Cl. ............................. 210/323.2; 210/433.1;
    210/441; 210/450; 210/451; 210/497.01
[58] Field of Search ................... 29/101; 210/323.2, 346,
    210/433.1, 437, 441, 442, 450, 451, 452, 486,
    497.01

[56] References Cited

U.S. PATENT DOCUMENTS

| | | | |
|---|---|---|---|
| 4,265,771 | 5/1981 | Lennartz et al. | 210/769 |
| 4,319,997 | 3/1982 | Pett | 210/323.2 |
| 4,713,174 | 12/1987 | Zievers et al. | 210/323.2 |
| 4,849,104 | 7/1989 | Sarcera et al. | 210/323.2 |
| 4,850,428 | 7/1989 | Paulus | 166/85 |
| 4,946,588 | 8/1990 | Wise | 210/323.2 |

Primary Examiner—Robert A. Dawson
Assistant Examiner—Wanda L. Millard
Attorney, Agent, or Firm—Shook, Hardy & Bacon

[57] ABSTRACT

A filter constructed of sections of plastic pipe reinforced by plastic bands glued to the pipe to increase the wall thickness at strategic locations and increase the surface area adjacent seals between the canister components. An encircling steel ring cooperates with a shoulder provided by one band for clamping three seals with one clamp. A second similar ring and band clamps a fourth seal. All seal clamps are of steel construction and are not exposed to corrosive fluid entering the filter. Commercially available stainless steel Helicoil thread inserts are utilized in holes through plastic material to afford greater strength and longevity for the filter.

10 Claims, 2 Drawing Sheets

FILTER CANISTER WITH A PLASTIC PIPE AND A METAL BUSHING

This invention relates to filters, and more particularly to a filter construction wherein the canister is fabricated largely from readily available, relatively inexpensive plastic pipe.

Filters are widely employed for clarifying water or other liquids. For example, water available for use in oil field production operations often contains foreign material which must be removed by filtering. A type filter commonly used for this purpose comprises a cylindrical canister containing a plurality of columns of cylindrical filtering elements of cellulose or other suitable filtering material. Contaminated water is introduced into one chamber of the canister containing the filter elements and the water must pass through the elements to pass to an outlet manifold or chamber in the canister as it flows through the filter. The foreign material contained in water entering the filter is, of course, separated from the water by the filtering elements in the canister.

The pressure drop across the filtering elements is usually substantial since relatively small particles normally must be separated from the water stream. The pressure drop increases as the filter elements become clogged with filtered material over time. Therefore, the liquid is commonly introduced into the filter under substantial pressure to insure a proper flow through the filter.

As a result, canisters for filters of this type must be capable of withstanding such pressures. Steel is conventionally used for constructing the great bulk of filter canisters used in oil field and other industrial operations because of its great strength. However, steel is highly subject to relatively rapid deterioration from the effects of exposure to corrosive materials such as brine, for example, often encountered in oil field operations. Corrosion resistant materials such as stainless steel could be used, but the relatively greater cost for such materials discourages their use for constructing the vessels in many large volume industrial operations.

Plastics are, of course, highly resistant to many corrosive materials such as brine. Some molded plastic filter canisters are used for relatively low volume, low pressure applications such as filters for drinking water at a household tap or the like. Filter canisters of this type are not capable of withstanding the high pressures involved in many industrial applications.

Accordingly, it is a primary object of the present invention to provide a construction for a filter canister wherein corrosion resistant plastic material can be used for those components exposed to such materials, with limited reinforcement by stronger materials at critical locations so that the canister is suitable for high pressure applications.

In the achievement of the foregoing object, it is a further important object of this invention to provide a filter canister construction which permits the use of readily available plastic pipe for major components with the pipe reinforced and augmented as required to achieve the economies from the use of such commercially available pipe without detracting from the ability of the canister to withstand commonly encountered levels of pressure.

Another object of this invention is to provide a construction of a substantially plastic filter wherein steel thread inserts are utilized for a novel role of protecting plastic threads on tubes which mount the filter elements, thereby permitting the use of plastic tubes for achieving economies of construction and longer life for the filter.

Still a further important object of the instant invention is to provide a construction for a filter of this type wherein rings strategically cemented to the exterior of the plastic pipe formed canister components at end edges provide the dual function of strengthening the components and providing sufficient width of material at the component end edges to permit grooving the edges to accommodate O-ring seals without adversely weakening the canister.

These and other important aims and objectives of the present invention will be further explained or will become apparent from the following explanation and description of the drawings.

In the drawings, FIG. 1 is a detailed, vertical cross-sectional view through a filter canister embodying the principles of this invention, parts being broken away and shown in cross-section to reveal details of construction;

Figure 1:
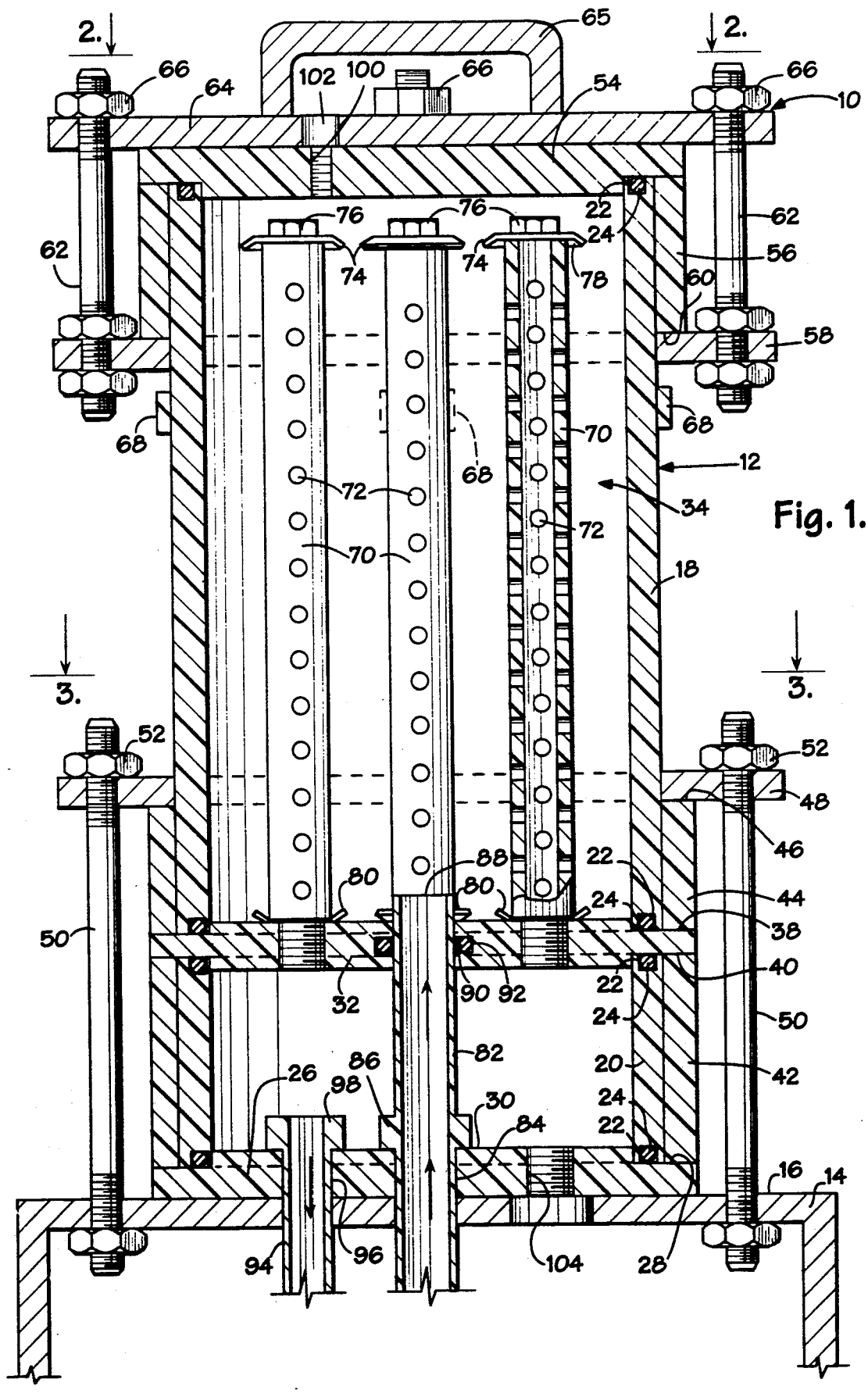
Figure 3:
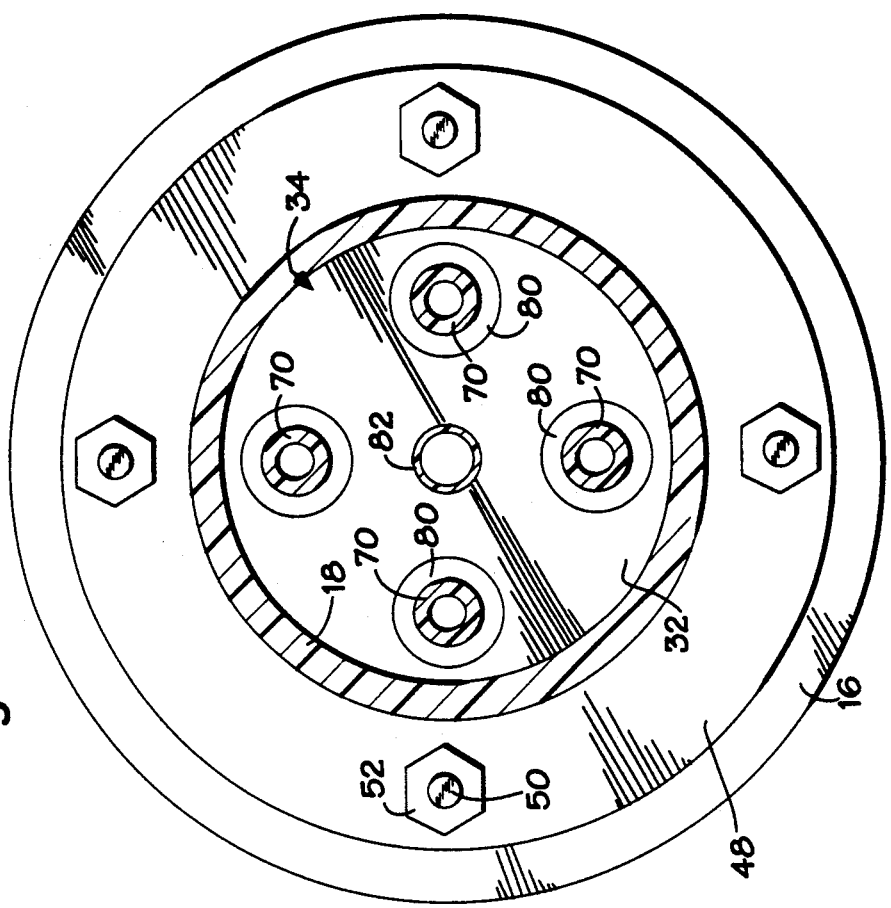
FIG. 3 is a view taken along line 3—3 of FIG. 1, parts being broken away to reveal details of construction.
Figure 2:
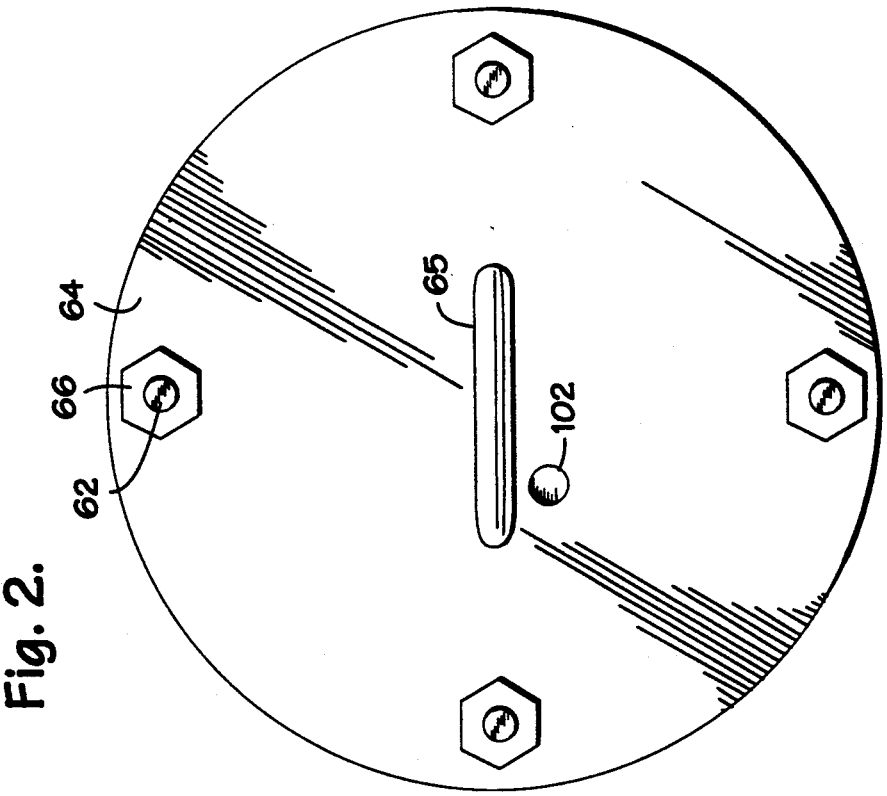
FIG. 2 is a top plan view taken along line 2—2 of FIG. 1.

A filter embodying the principles of this invention is broadly designated by the reference numeral 10 and includes a canister 12 adapted to be supported on any suitable base such as the steel member 14 having a flat upper surface 16 as shown fragmentally in FIG. 1. Member 14 should be sufficiently strong to withstand the weight of the filter during operations, as well as clamping forces holding certain filter components together as will be subsequently explained. ¼ inch thick steel has been found adequate for this purpose.

Filter canister 12 is constructed principally from plastic pipe. The canister 12 includes an upper section 18 comprised of an elongated, cylindrical preferably C-900 PVC pipe and a lower section 20 of identical pipe with the sections axially aligned as shown in the drawing. Each end of each of the sections 18 and 20 are provided with grooves 22 extending entirely around their respective pipe section ends and communicating with the section side wall end surfaces as shown in the drawing. An O-ring 24 is provided for each groove 22 and is positioned in its respective groove as shown.

The bottom of canister 12 is closed by a relatively thick, plastic disc or end cover 26 having a greater outside diameter than the diameter of pipe sections 18 and 20. Disc 26 preferably comprises a plate of one inch thick PVC material having an annular surface 28 machined from the upper surface 30 to provide a seat for receiving the proximal end of pipe section 20 to seal the end of the canister with O-ring 22 sealingly engaged against surface 28. As shown in the drawing, disc 26 sits on the flat surface 16 of member 14 with canister 12 extending in an upright disposition.

A disc 32 which is preferably also of one inch thick PVC material is disposed in covering relationship over the upper end of pipe section 20 and also the lower end of pipe section 18 to provide a partition for the canister dividing the interior chamber of the canister into an upper compartment 34 and a lower compartment 36. Disc 32 also has a greater diameter than the outside diameter of pipe sections 18 and 20. Annular surfaces 38 and 40 are machined on the upper and lower surfaces of disc 32 similar to surface 28 described with respect to disc 26 for the purpose of providing seats for sealing the lower end of pipe section 18 and the upper end of pipe section 20 as will be readily understood. The corresponding O-rings 24 in the respective grooves 22 for the proximal end of each pipe section are sealingly engaged against the seat surfaces of the partition as shown in the drawing.

The grooves 22 machined in the pipe section side walls at the section ends to receive their corresponding O-ring seals 24 effectively reduce the thicknesses of the pipe material at the groove locations. This reduction in wall thickness would materially reduce the strength of the pipe sections and result in a corresponding reduction in the pressure rating for the canister. However, to avoid this disadvantage, an encircling annular band 42 of the same material as the pipe section and of the same thickness of the section has an interior diameter substantially equal to the outer diameter of the pipe section and is telescoped over section 20 as shown in the drawing. Band 42 is of equal length to section 20 so that the end surfaces of the band are co-planar with the end surfaces of the pipe section. Band 42 is preferably glued to section 20 in the disposition shown in FIG. 1 of the drawing.

It will be readily recognized that band 42 substantially doubles the effective wall thickness for section 20 to strengthen the latter. Further, the effective widening of the end surfaces of the pipe section by the reinforcing band 42 ensures that there is sufficient width of material at the ends to permit the O-ring receiving grooves to be machined in the ends of the section without reducing the effective material thickness to such an extent that sealing is adversely affected.

For the aforestated reasons, a second band 44 which may be identical to band 42 but need not extend the full length of the pipe section 18 is glued to section 18 proximal its lowermost end as shown in the drawing. Band 44 serves the purpose of strengthening pipe section 18 in the region adjacent to its sealing groove 22 proximal partition 32. Further, the uppermost end of band 44 provides an annular shoulder 46 which is engaged by an annular steel ring 48 disposed around pipe section 18 as shown in the drawing. Ring 48 is provided with a plurality of vertically extending holes therethrough which receive corresponding bolts 50 having one end received through corresponding holes in base member 14 and the other threaded end receiving nuts 52 which engage ring 50 for providing a clamping force against band 44 as will be subsequently more fully described. Band 44 is, of course, glued to pipe section 18 and the lower end of the band is co-planar with the lower end of section 18 as shown.

The top cover for the canister comprises a PVC disc 54 similar to disc 30 and machined to provide a seat for sealing engagement with the O-ring seal 24 for the proximal end of section 18. An annular band 56 substantially identical to band 42 is glued to the outer surface of pipe section 18 at the upper end of the latter as shown. The upper end of band 56 is co-planar with the upper end of pipe section 18.

A steel ring 58 which may be indentical to ring 48 is telescoped over pipe section 18 prior to the gluing of band 56 to the pipe during fabrication of the canister. Ring 58 is adapted to engage the flat shoulder 60 on the lowermost end of band 56 to provide a clamping force to sealingly secure disc 54 in covering relationship over the upper end of section 18. Thus, ring 58 is provided with suitable holes spaced around the periphery of the ring which receive one end of bolts 62. The other threaded ends of bolts 62 are received through corresponding holes in a steel cover plate 64 as shown. Nuts 66 on bolts 62 provide means for exerting a downward force on the plate, clamping disc 54 against the upper end of pipe section 18. This clamping force compresses the O-ring and seals the upper end of the canister.

Plate 64 can be relatively easily removed to provide access to the interior of the canister. In order to prevent ring 58 from gravitating away from its position proximal the upper end of the canister when nuts 66 are removed from their corresponding bolts, elongated strips 68 of preferably plastic material are secured as by gluing to the outside of pipe section 18 as shown in FIG. 1. Strips 68 are preferably disposed at spaced apart intervals to conjointly define a stop to hold ring 58 near its operative position. A handle 65 secured to plate 64 facilitates the installation and removal of plate 64.

Canister chamber 34 is adapted to contain the usual appropriate expendable filter elements (not shown). To this end, partition disc 32 is drilled with a plurality of preferably ⅜ inch diameter relatively spaced holes extending through the plastic disc. Each hole is fitted with a ⅜ inch NPT stainless steel thread insert of the type readily available commercially under the trademark Helicoil. These inserts are commonly used for providing internal threads for holes in metal components when the original tapped threads for such holes have been stripped or damaged beyond effective use.

Each insert lined hole in partition 32 threadably receives male threads cut on the proximal end of a preferably ⅜ inch diameter, schedule 80, PVC pipe comprising a tube 70 adapted to receive one or more cylindrical, tubular filter elements telescoped over the tube 72 as is conventional. A plurality of holes 72 through the side walls of the tubes 70 serve to permit the egress of fluid from compartment 34 into the respective tubes 70 and through the tubes into compartment 36 as will be readily understood. In the preferred construction, four rows of 5/16 inch holes are drilled one inch apart along the length of each tube as shown. Each series of holes is offset 90° from the adjacent series and the respective holes of a series are offset ½ inch from an adjacent series.

The uppermost end of each tube 70 is counter bored a short distance from the end and fitted with a stainless steel Helicoil thread insert 74. A stainless steel bolt 76 is threadably received in insert 74 and, in conjunction with a conventional stainless steel washer 78 closes the upper end of each tube 70 to restrict the egress of fluid from chamber 34 to holes 72. Washers 80 are installed on the tubes proximal partition 32 to prevent migration of fluid between the inner surfaces of the filter elements and the corresponding tubes so that fluid in compartment 36 must travel transversely through the walls of the cylindrical filter elements in order to gain access to holes 72 for flowing through the tube into compartment 36. Obviously, bolts 76 may be easily removed to permit ready installation and removal of the cylindrical filter elements in telescoped relationship over the respective tubes 70.

A plastic inlet pipe 82 passes through a suitable opening in member 16 and is glued in an aperture 84 through end disc 26. Preferably, a plastic collar 86 is installed over pipe 82 immediately above disc 26 and is glued to the pipe to impart strength and stability to the pipe. The outlet end of the pipe (not shown) is preferably threaded to facilitate attachment with a source of fluid to be filtered.

Inlet pipe 82 extends through partition 32 and the upper end 88 of the pipe is in communication with chamber 34 of the canister. An O-ring 90 in a groove 92 encircles pipe 82 and seals against fluid leaking past partition 32 around the pipe.

A drain pipe 94 of plastic material is glued in an aperture 96 through disc 26. A plastic collar 98 is telescoped over the pipe and is glued to the latter to securely stabilize the drain pipe. The drain pipe passes through an opening in the steel member 14 and terminates in a threaded end (not shown) adapted to receive a valve, outlet piping or the like.

Provision is made in the form of a threaded aperture 100 through the top disc 54 for installation of suitable venting apparatus such as a safety "pop-off" valve or the like. A hole 102 in cover plate 64 is aligned with aperture 100 to facilitate installation of the venting apparatus.

The operation of filter 10 will be generally apparent to those skilled in the art. The three lower O-rings are provided sealing compression forces by tightening nuts 52 down against ring 48 thereby clamping the upper pipe section 18 to the base member 14 and compressing the O-ring seals therebetween. The use of the steel ring 48 which engages shoulder 46 provided by the reinforcing band 44 eliminates the need for separate sealing assemblies for the bottom cover disc 26 and intermediate partition 32. When the expendable filter elements have been installed on their respective upright tubes 70 in compartment 34, clamping force is exerted by bolts 62 and ring 58 acting against shoulder 60 of band 56 to compress the upper O-ring and seal the upper end of the canister. Fluid to be filtered is admitted under pressure (commonly 150 p.s.i. or more) to compartment 34 via inlet pipe 82 where the foreign material is filtered from the fluid as the latter travels through the filtering elements and egresses to compartment 36 through the tubes 70. Compartment 36 comprises a collecting manifold for fluid emanating from the various tubes 70 and the fluid in compartment 36 egresses the filter through drain pipe 94. Whenever necessary, the filter can be drained through port 104 which is threaded to receive a plug (not shown). Port 104, aperture 100 and the upper ends of tubes 70 are preferably provided with stainless steel Helicoil inserts.

It should be pointed out that the novel use of commercially available stainless steel Helicoil thread inserts in the construction of the filter of this invention figures significantly in the ability to use corrosion resistant plastic pipe and plastic components in the fabrication of the filter. For example, the threads mounting the vertical tubes 70 in partition 32 are subjected to more than insignificant stress during frequent changing of the filter elements on the tubes cantilevered from the partition. The relatively strong stainless steel Helicoil threads permit the use of plastic mating threads on the tubes which can be formed by a relatively inexpensive thread cutting process. Conjointly, the stainless steel insert threads with the plastic tube threads have sufficient strength for adequate durability for long term operation of filter 10.

It will be understood that filter 10 may be used with relatively corrosive materials such as brine or the like because all of the components of the filter exposed to the fluid are constructed of non-corrosive materials. The novel use of plastic pipe, reinforced at critical locations as described, holds the use of relatively expensive stainless steel to an absolute minimum without adversely affecting the strength capabilities of the filter. The major components of the canister are commercially available plastic pipe which enhances the economies achievable with the novel construction of a filter pursuant to the principles of this invention.

Having thus described the invention I claim:

1. A filter canister for accommodating pressurized fluids, said canister comprising:
   an elongated, cylindrical plastic pipe having a pair of open ends;
   a cover for each end of the pipe respectively, each cover being disposed across its corresponding pipe end engaging the pipe and closing the pipe whereby the pipe and covers conjointly define a chamber within the pipe;
   a reinforcing band for each end of said pipe respectively, each band being disposed in encircling relationship around the pipe adjacent its corresponding pipe end in disposition to reinforce the pipe side wall in the region adjacent said end; said pipe comprising a pair of cylindrical sections of like diameter, said sections being disposed in longitudinal alignment;
   a partition extending transversely across the pipe between the sections dividing said chamber into a pair of compartments, there being at least one reinforcing band for each section respectively, each end of each pipe section having a corresponding end edge of a reinforcing band extending in co-planar relationship therewith to provide enhanced strength and width for the canister at said section ends;
   a steel plate extending across the cover over the end of one of said pipe sections;
   a steel ring encircling the other pipe section, said ring having a smaller internal diameter than the external diameter of said band encircling the end of said other section proximal said one section; and
   clamp means interconnecting said ring and said plate for applying tensile force to the pipe sections for holding the sections sealed against said partition.

2. A filter canister as set forth in claim 1, wherein each of said bands has an end edge co-planar with its corresponding end of said pipe, there being a seal receiving groove in said pipe end, whereby the band reinforces the pipe to offset any weakening of the latter as a result of said groove.

3. A filter canister as set forth in claim 2, wherein each of said bands is glued to said pipe.

4. A filter canister as set forth in claim 2, and an O-ring seal in each of said grooves, each of said seals being disposed to sealingly engage its corresponding cover.

5. A filter canister as set forth in claim 1, wherein said bands are constructed from plastic pipe.

6. A filter canister as set forth in claim 1, wherein said partition comprises a rigid plastic member, there being a plurality of holes through the member communicating said compartments, a steel thread insert for each hole respectively, each insert being installed in its corresponding hole,
   an elongated, rigid plastic tube for each hole respectively, each tube having a threaded end threadably engaged in the insert for its corresponding partition hole with the tube extending longitudinally from the partition into one of said compartments, each tube having a plurality of apertures through the side wall of the tube for flow of fluid into the tube from said one compartment through the partition and into said other compartment, and means closing the ends of said tubes opposite said threaded end, said tubes being adapted to receive filter elements telescoped over the tubes whereby fluid in said one compartment is filtered by said elements as it flows from said one compartment to said other compartment.

7. A filter canister as set forth in claim 1, and means releasably securing the cover to the end of said other section remote from the partition, whereby to permit removal of the cover to provide access to the corresponding compartment.

8. For use in a filter canister, a partition extending transversely across the canister for dividing the canister into a pair of compartments and for releasably mounting one end of at least one elongated filter tube to extend cantilevered from the partition into one of said compartments, said partition and said tube being of plastic material to minimize corrosion, the improvement of said partition comprising:
- a hole extending transversly through the partition; and
- a helical coil thread insert of metal material installed in said hole,
- an end of said plastic tube being provided with plastic threads, the plastic tube threads being adapted to be threadably engaged in the helical thread insert whereby said tube is secured to the partition.

9. A partition as set forth in claim 8 wherein said insert is of stainless steel material.

10. A filter canister for accommodating pressurized fluids, said canister comprising:
- an elongated cylindrical plastic pipe having a sidewall and a pair of open ends;
- a plastic cover for each end of the pipe respectively, each cover being disposed across its corresponding end of the pipe to close the pipe ends thereby defining a chamber within the pipe;
- a reinforcing band for each end of said pipe respectively, each band being disposed in encircling relationship around the pipe adjacent its corresponding pipe end in disposition to reinforce and to increase the effective thickness of said pipe sidewall at said corresponding end;
- seal means disposed at each pipe end for sealing against fluid passage between the covers and the corresponding pipe ends; and
- means for each end respectively to clamp the covers to said pipe, each clamp means including a steel backing plate on the side of said cover remote from the pipe, a steel ring encircling said pipe and engaging the corresponding band with the latter preventing sliding of the ring from said pipe encircling position, and tension means operably coupled with the ring and plate respectively for imparting a clamping force to clamp the cover to said pipe.

* * * * *